United States Patent [19]

Chen et al.

[11] Patent Number: 4,726,550
[45] Date of Patent: Feb. 23, 1988

[54] COMPREHENSIVE AIRPLANE SAFETY SYSTEM

[76] Inventors: Bao C. Chen; Shih C. Chen, both of No. 24, Lane 20, Tung Hsing Road, Tainan, Taiwan

[21] Appl. No.: 29,227

[22] Filed: Mar. 23, 1987

[51] Int. Cl.⁴ .................................................. B64C 1/24
[52] U.S. Cl. .............................. 244/137.2; 244/129.5; 244/118.6; 244/905; 440/27; 440/98
[58] Field of Search .................. 244/118.5, 118.6, 119, 244/122 A, 138 R, 141, 129.4, 129.5, 137.2, 905; 440/27, 98, 21, 26, 90; 441/59, 56

[56] References Cited

U.S. PATENT DOCUMENTS

| | | | |
|---|---|---|---|
| 1,777,749 | 10/1930 | Equiluz | 440/27 |
| 1,798,137 | 3/1931 | Beck | 244/137.2 |
| 2,390,230 | 12/1945 | Trusty | 244/141 |
| 2,547,811 | 4/1951 | Burnelli | 244/118.3 |
| 3,580,213 | 5/1971 | Yven | 440/27 |
| 3,601,391 | 8/1971 | Hertel | 244/118.6 |
| 4,097,008 | 6/1978 | Pender | 244/137.2 |
| 4,552,325 | 11/1985 | Bruensicke | 244/118.5 |

FOREIGN PATENT DOCUMENTS

| | | | |
|---|---|---|---|
| 1170642 | 1/1959 | France | 440/98 |
| 2236529 | 2/1975 | France | 440/27 |

Primary Examiner—Galen Barefoot

[57] ABSTRACT

An airplane with an enlarged safety door in the lower middle part of the fuselage which can be opened during mid-flight emergencies so as to let emergency exit stairs be hydraulically lowered down therefrom. The stairs have a hydraulically operated slideway on the lower end thereof. Chair assemblies which are slidable on rails and which are normally retained by a flip-up board. The chair assemblies can be moved either manually or by means of a motor driven draw cord. A user propelled water safety device comprising an inflatable chest support, two handlebars two inflatable paddlewheels and two floatation devices. A bouyant, collapsible carry-all which can be used to carry survival and safety items upon exit of the plane and which has holes in the bottom thereof for easy draining. An air-flow system comprising an air exhaust shield, a plurality of fans, air vents distributed at even intervals along the ceiling of the plane. An air supply system comprising pipes that run between the walls of the airplane to a plurality of outlets on the end sections of the pipe.

1 Claim, 19 Drawing Figures

COMPREHENSIVE AIRPLANE SAFETY SYSTEM

BACKGROUND OF THE INVENTION

This invention relates to airplane safety systems, especially those systems concerning passenger and pilot safety. In the past, it was difficult to get everyone out of the plane quickly enough in the event of a mid-air emergency situation. This was partially due to the fact that there were only two main passenger doors and several emergency doors. But in emergency situations, it is easy for the passengers to panic and forget to use the emergency doors. In addition, when these conventional doors were opened, there was the problem that people were often pulled out of the plane by the suction surrounding the doors and/or hole in the plane's fuselage. Also, in the past, it was too easy for a hijacker to break into the pilot's cabin and thereby control the flight of the plane. Finally, if the plane crashed or had difficulties over the sea or large lakes, then the passengers did not have a lot of mobility to get to a safe place.

It is the purpose of this present invention, therefore, to mitigate and/or obviate the above-mentioned drawbacks in the manner set forth in the detailed description of the preferred embodiment.

SUMMARY OF THE INVENTION

A primary objective of this invention is to provide a comprehensive airplane safety system which allows for mass exiting of the plane.

Another objective of this invention is to provide a comprehensive airplane safety system which protects the pilot from hijackers and explosive devices.

A further objective of this invention is to provide a stable flow of air during emergency in-flight exit conditions.

Another objective is to provide user mobility in case the plane crashes or passengers for some reason must bale out over the sea or over a large lake (for example the Great Lakes).

Further objectives and advantages of the present invention will become apparent as the following description proceeds, and the features of novelty which characterize the invention are pointed out with particularity in the claims annexed to and forming a part of this invention.

BRIEF DESCRIPTION OF THE DRAWINGS

FIG. 2-0 is a cutaway view of the passenger section of a plane in accordance with the present invention, showing how the chair assemblies and safety door operate;

FIG. 2-1 is a close-up perspective view of the safety wall and safety door in accordance with the present invention;

FIG. 2-2 is a cutaway cross-sectional view of a safety door in accordance with the present invention, showing the multiple layers therein;

FIG. 2-3 is a cutaway perspective view of a seat assembly and flip-up board in accordance with the present invention;

FIG. 4-0 is a front elevational view of a seat assembly in conjunction with a sliding assembly, in accordance with the present invention;

FIG. 4-1 is a cutaway view of one side of a sliding assembly in accordance with the present invention;

FIGS. 9-1 and 9-2 are exploded views of the water safety device of the water safety device of FIG. 8;

FIG. 10-1 is a perspective view of the paddlewheel of the water safety device of FIG. 8 in uninflated condition;

FIG. 10-2 is a perspective view of the chest support of the water safety device of FIG. 8 in uninflated condition;

FIG. 11-1 is a perspective view of a carry-all in folded condition in accordance to the present invention;

FIG. 11-2 is a perspective view of the carry-all of FIG. 11-1 in unfolded condition;

DETAILED DESCRIPTION OF THE PREFERRED EMBODIMENT

Figure 1:
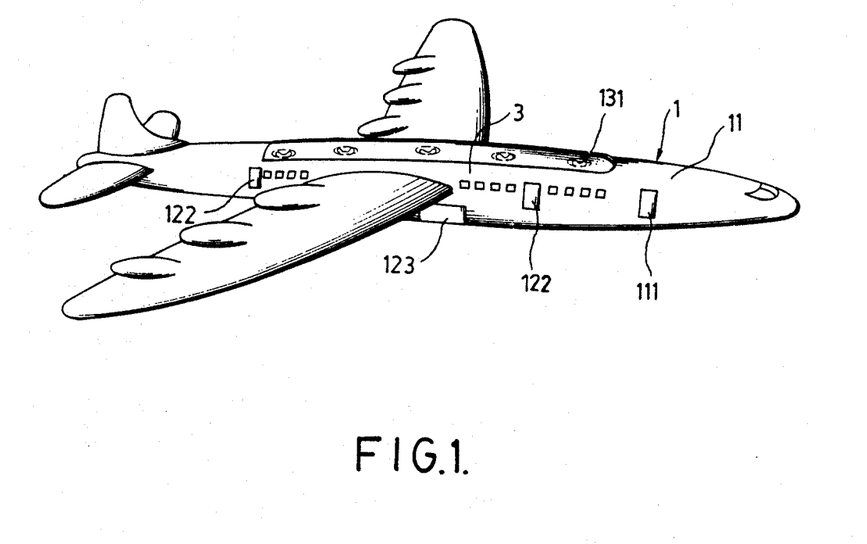
FIG. 1 is a perspective view of the outside of the body of an airplane in accordance with the present invention.

Referring to FIG. 1, it can be seen that the plane 1 using the comprehensive safety features of the present invention outwardly comprises an oversized safety door 123 and an air-flow system 131 and a pilot exit door 111, as well as the normal passenger doors 122 and the other obvious exterior features of an airplane. The safety door 123 is on the lower mid-portion of the fuselage 11 of the airplane.

FIG. 2-0 shows a cutaway view of the passenger section. Only one chair assembly 31 is shown for clarity. Normally, the chair assembly 31 is retained by side boards 32. The side boards 32 are slotted so as to hold the arm support 311 in place (see FIG. 4-1). The side boards are normally positioned horizontally and are level with the central floor board 121. Referring further to FIG. 2-3, the manner in which the arm support is held in place can be seen more clearly. The arm support 311 is held firmly in place by the flip-up board 330. When it is desired to slide the seat assembly 31 forward or backward, the user simply pulls up on the hand grips 332 and releases the chair assemblies 31 so that they can be slid together, thereby leaving a large open space in the floor so that a flip-up floor section 15 can be flipped up and emergency exit stairs 4 can be easily accessed (see FIG. 5).

Figure 40:
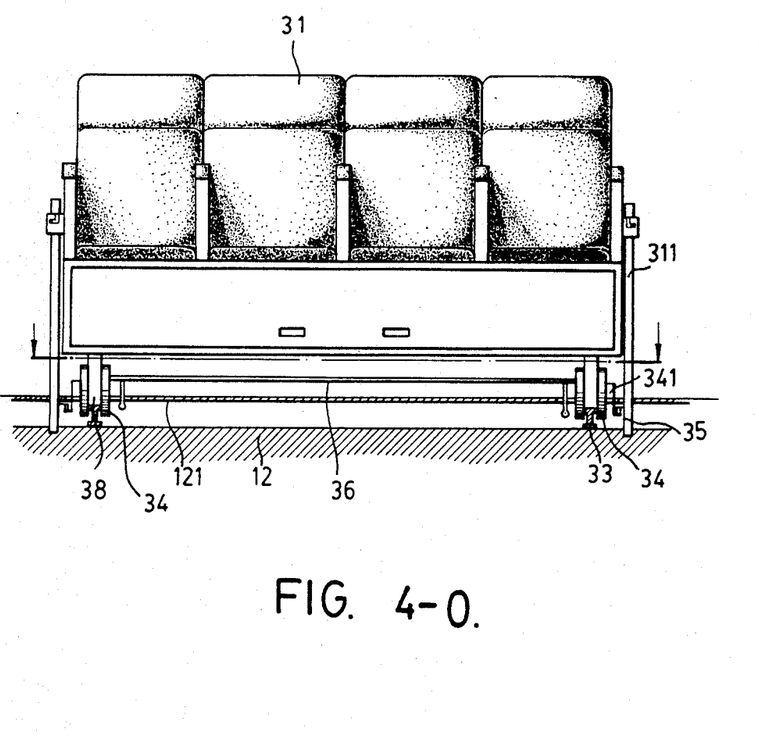
Figure 41:
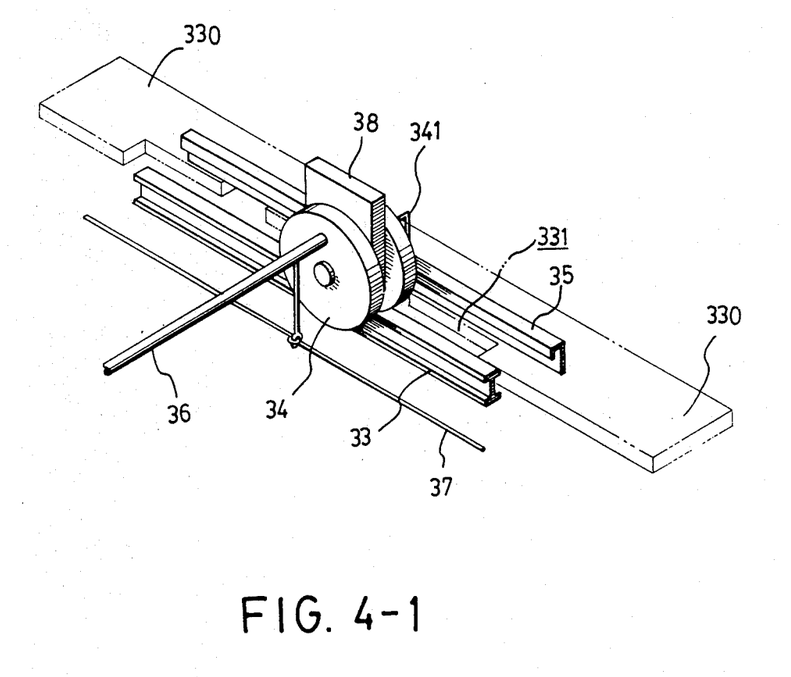
Figures 91, 92:
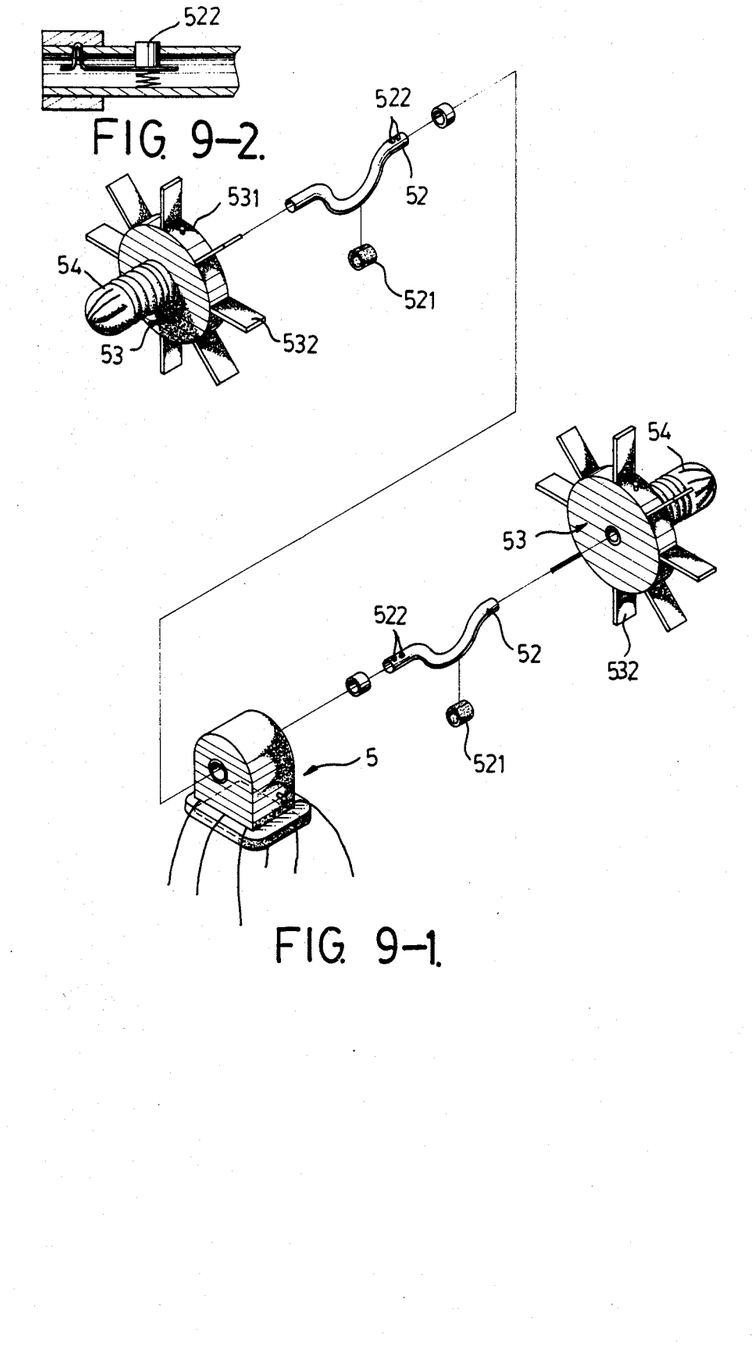

Referring back to FIG. 4-1, it can be seen that during emergency situations, the retainer wheel assembly 34 is drawn by an indirectly connected draw cord 37 (see the figure), which is drawn by some type of motor. However, even without the motor, the passengers or crew can slide the chair assemblies 31 (FIG. 4-0) into their desired positions.

Figure 3:
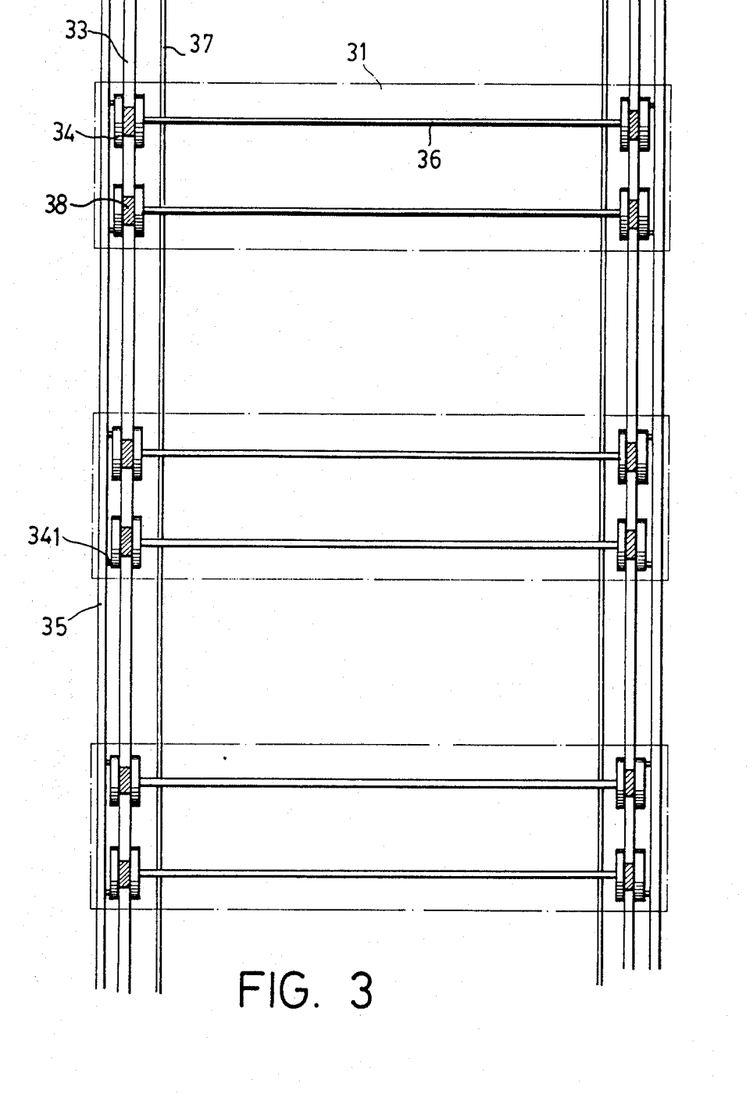
FIG. 3 is a top view of a sliding assembly in accordance with the present invention.

From FIGS. 3 and 4-0, several features of the sliding assembly can be seen. Firstly note that the lower part of the leg supports 38 have the retainer wheel assembly connected thereto. Secondly, notice that the wheel assembly 34 on the outer side has a retainer hook 341 protruding therefrom. This hook 341 bends downwards and the bottom end thereof is U-shaped so as to fit under a retainer rail 35, thereby preventing the chair assembly 31 from bouncing off the rail during turbulence or turning conditions (i.e. preventing any vertical movement of the chair assembly with respect to the rail. In addition, note that a connecting rod 36 connects the two wheel assemblies (as seen in FIG. 4-0) on either side of the chair assembly 31. This rod 36 provides a means for making sure the force applied to the two wheel assemblies 34 by the draw cord 37 is evenly distributed therebetween.

Figure 5:
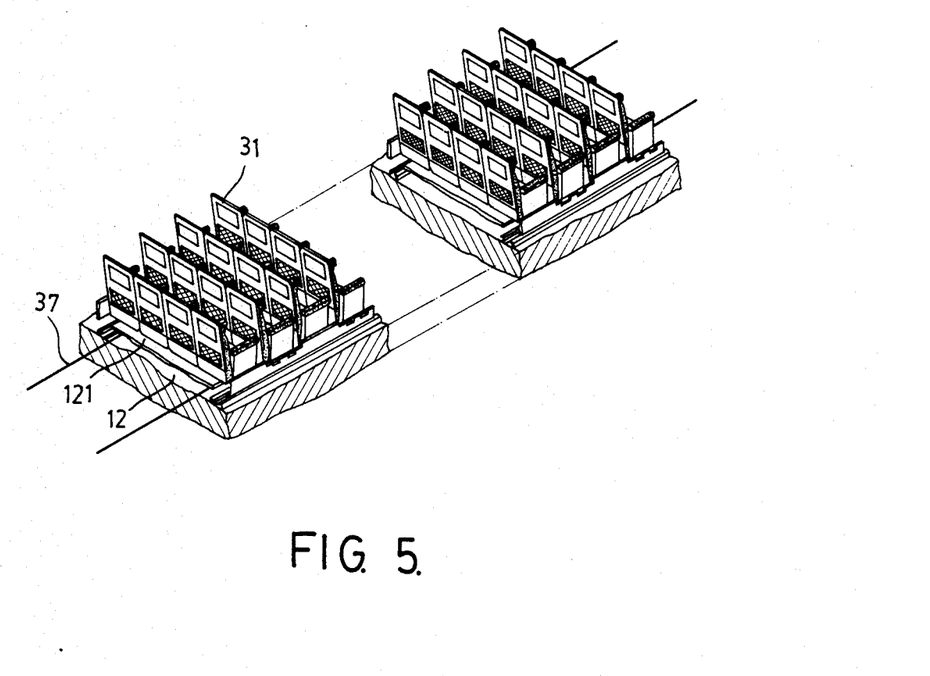
FIG. 5 is a cutaway view of the passenger section of a plane, in accordance with the present invention, showing how the chair assemblies can be slid together to create an opening for an exit door.
Figure 6:
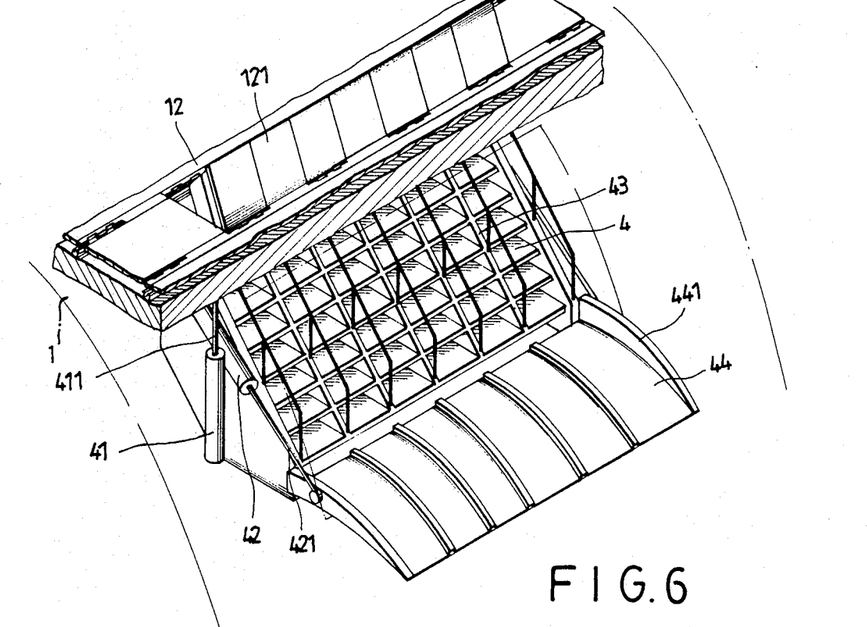
FIG. 6 is a perspective view of an emergency exit stairs in accordance with the present invention.

Once the chair assemblies 31 are slid together so as to clear the space above the flip-up floor section 15, then the emergency exit stairs 4 can be activated and used, as can be understood from FIGS. 5 and 6. In FIG. 5, the chair assemblies 31 have already been slid together so as to create a space therebetween. This space comprises the flip-up floor section 121. In other words, the space above the flip-up floor section 121 is cleared by sliding the chair assemblies 31 out of the way. The flip-up floor section is adjacent to (i.e. directly above) the safety door 123 on the passenger section of the airplane. But first the safety door 123 of the plane (see FIG. 1) is opened by remote control. When activating the emergency exit stairs 4, the stairs 4 must first be lowered into the proper orientation (i.e. extending out from the safety door 123) by the hydraulic stairway lowering means 41. Next, the slideway 44 must be lowered into sliding (down) position by the hydraulic slideway lowering means 42. Finally, the flip-up floor section 121 must be lifted up so as to allow the passengers to exit the plane. With a parachute and any other articles they may need (these articles will be discussed later), the passengers walk down the emergency exit stairway 4 and then sit on the slideway 44 and slide off.

Figure 21:
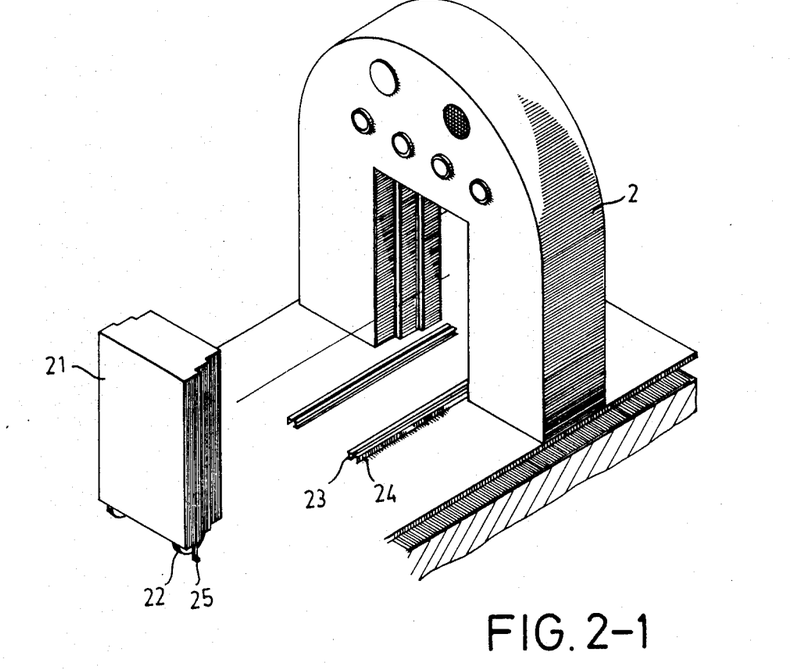

Another feature of the present invention is that pilot safety is provided. FIG. 2-1 shows the safety wall which is provided between the passenger cabin and the pilot's cabin. The wall has four lights on the upper section thereof to keep the crew and passengers notified of the current state of the plane. Each light has a different meaning. One light is green, and when it is lit up the plane is in normal condition. The other lights are red and all notify different types of emergency or hijack conditions. A safety door 21 is fitted with roller wheels 22 so that it can be rolled back and forth so as to let the pilot in and out. The lower outer sides of the safety door 21 are equipped with alignment hooks which are guided in alignment rails 24. These hooks 25 keep the safety door 21 from rolling in the wrong direction. When the pilot is in his cabin, the safety door 21 is closed and locked (preferably automatically by the pilot).

Figure 22:
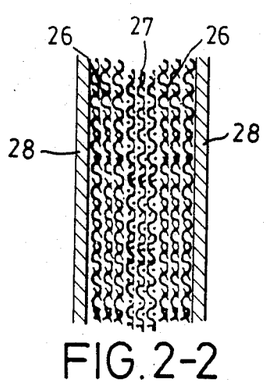
Figure 23:
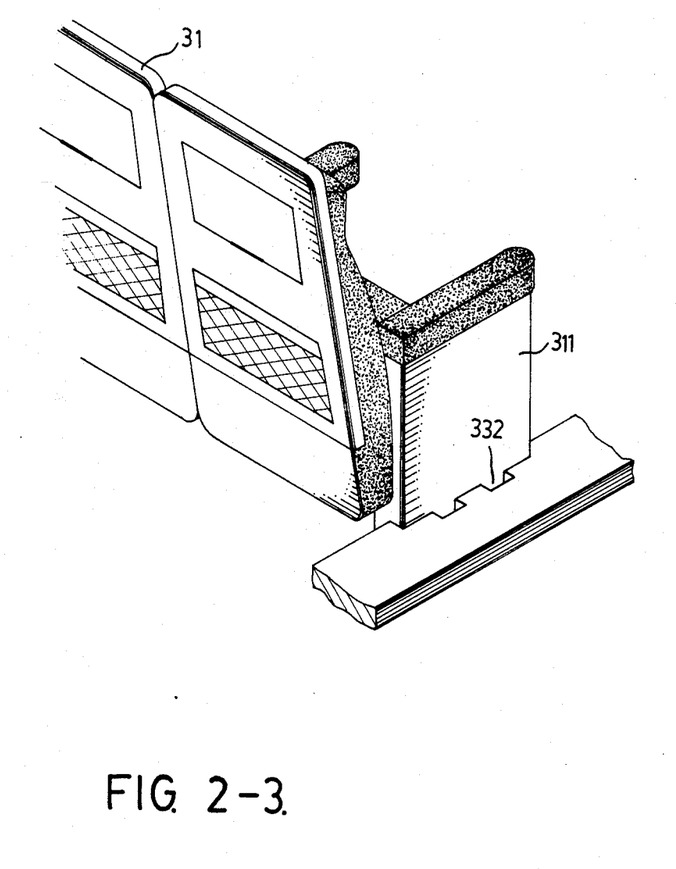

FIG. 2-2 shows how the safety wall 2 and door 21 is made up of many layers of metal link 26 and silk 27. Multiple layers of silk are often used in bullet-proof vests and hence it is obvious that it would be an appropriate material to protect the pilot's cabin from bullets, explosives, etc. The outside of the wall 2 and door 21 are covered by an appropriate and attractive material 28; however, the assurance of the pilot's safety lies in the multiple layers 26 and 27 discussed above.

Figure 7:
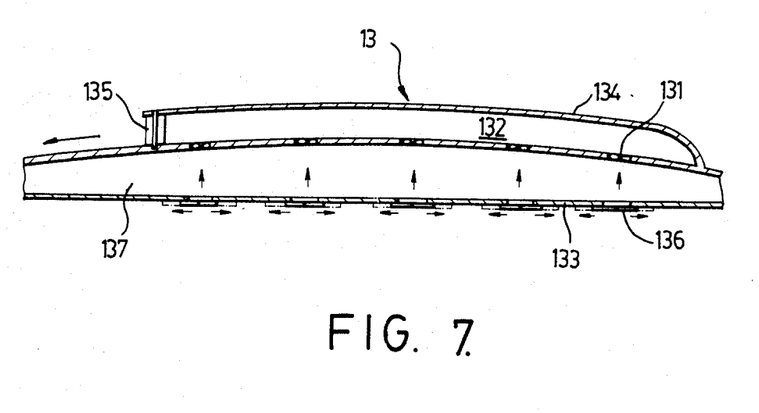
FIG. 7 is a cutaway elevational view of an air flow system of the present invention.

Now please refer to FIG. 1 and FIG. 7. FIG. 7 shows a cutaway cross-sectional view of an air flow system 13. This system helps to stabilize and decentralize air flow in the event that an emergency door must be opened or in the event that for some reason a hole is formed in the fuselage 3 of the plane 1. If, for instance, the safety door 123 were opened without this air flow system 13, then there would be a suction force around the opened safety door 123. However, using the air stabilizion system 13, air is purposely channeled through the plane during the time that the safety door is open, so as to stabilize the flow of air therein. In order to prevent one localized dangerous current of air, a long section of the upper ceiling of the plane 133 has air vents 136 which intake air from the passenger section of the plane. Since these air vents 136 are evenly spread out along the ceiling 133 of the passenger section of the plane, there is no localized flow of current from the safety door 123 to the air flow system 13. This, in turn, prevents the very dangerous suction that would otherwise surround the safety door 123 should the safety door 123 be opened during flight.

Still referring to FIG. 7, it can be seen that the air flow system 13 has a plurality of fans 131 set in the outer shell of the airplane's fuselage which draw the air from the passenger section of the plane into the air vents 136. As the air is drawn from the passenger section, it goes through an air cavity 137 between the ceiling of the passenger section and the fuselage 11. The air continues to flow through the fans 131 themselves and out an exhaust passage 132 and finally out the exhaust outlet 135. The exhaust shield 134 is necessary to prevent turbulent air from distrubing the normal airflow around the body of the plane. The shield 134 channels the air to be exited out the exhaust outlet 135, in a direction which does not greatly affect the airflow around the plane, as indicated by the arrow.

Figure 8:
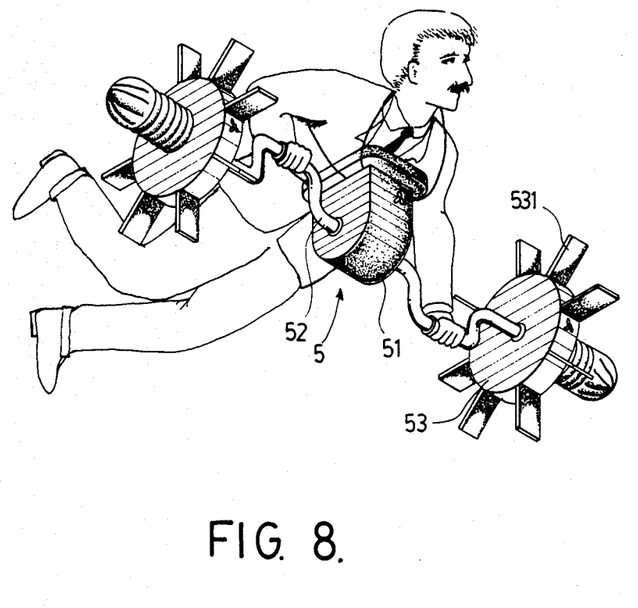
FIG. 8 is a perspective working view of a water safety device in accordance with the present invention.

Another aspect of the present invention is that if a plane according to the present invention should have difficulty over the ocean or over a large body of water, then each passenger can be equipped with a water safety device 5, as seen in the working view of FIG. 8. This device 5 is designed to keep the user afloat in the water and allow the user to paddle himself to safety. The safety device 5 comprises a chest support 51, two paddlewheels 53 with a plurality of paddles 531 thereon, two floatation devices 54, and two handlebars 52. When the user reaches the body of water, he positions himself on top of the chest support 51 and grabs the handlebars 52. The handlebars are offset 180 degrees (much like the pedals on a bicycle) so that the user can provide balanced self-propulsion thereof. Further referring to FIG. 9, it can be seen that slide grips 521 are provided on the handlebars 52 to prevent continual rubbing against the user's hands. In addition to the floatation devices 54, the chest support 51 and paddlewheels 53 are inflatable, thereby providing extra floatability to ensure that the user will have enough bouyant support to keep him afloat. Even if, for instance, one of the paddlewheels 53 somehow became deflated, the user would still stay afloat. In deflated condition, the chest support 51 and the paddlewheels 53 are as shown in FIGS. 10-2 and 10-1, respectively. Of course, in deflated condition, they take up much less space and are therefore much more suited for storage on the plane than in inflated position. In addition, the chest support 51 and paddlewheels 53 each have a valve for air insertion therein.

Figure 111:
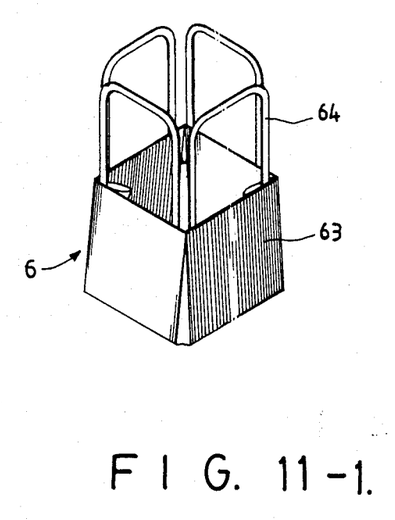
Figure 112:
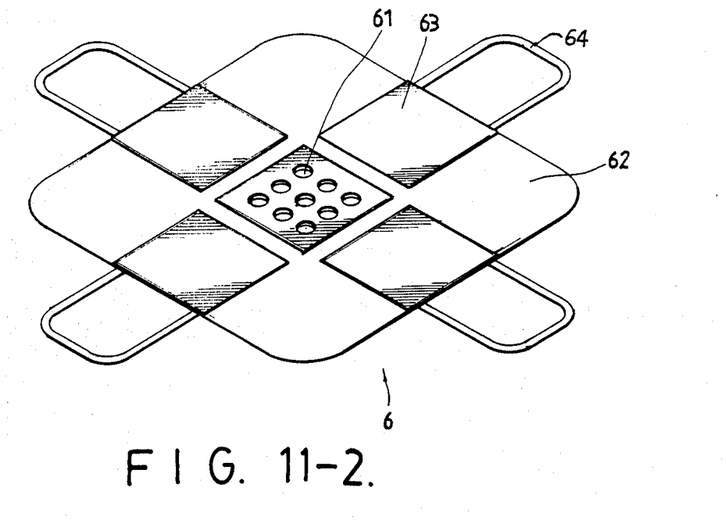

Besides the water safety device 5, the comprehensive airplane safety system herein set forth also comprises a collapsible carry-all 6, which can be seen in FIGS. 11-1 and 11-2. FIG. 11-1 shows the carry-all as it would appear before unfolding. An assortment of safety and- /or survival items are stowed therein beforehand so that the passenger or crew member has ready access to these things as he is making his emergency exit. These items could include any combination or all of the following items, among others: (1) a lighter or matches; (2) whistle, horn, or buzzer; (3) string/rope; (4) knife or pocketknife; (5) pliers; (6) SOS flare, indicator or flag; (7) safety helmet; (8) food and liquid rations; (9) an air pump or compressor; and (10) flashlight. FIG. 11-2 shows the carry-all in an unfolded condition, so that it can be used as a multi-purpose spread.

Figure 101:
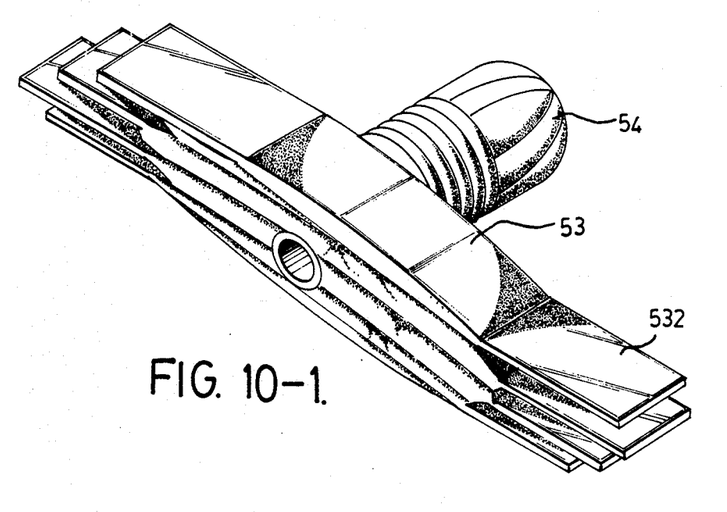
Figure 102:
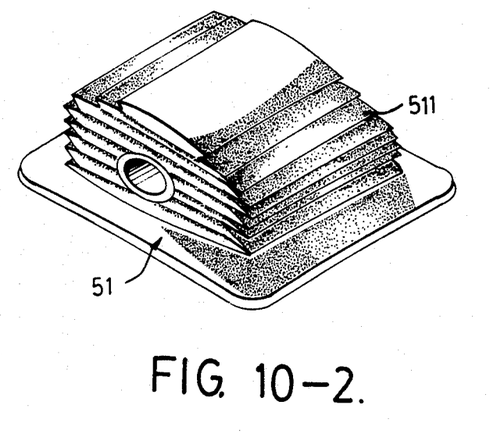

Referring back to FIG. 10, it can be seen that the carry-all 6 comprises four air pockets 63 which keep the carry-all 6 afloat while the user is on the water. When the user reaches land, he can unfold the carry-all and make it into a spread for eating on, working on, etc. Also, the user is provided with four handles 64 for easy grasp of the carry-all 6 during emergency exit conditions. The drainholes 61 are provided in the central part of the carry-all so that if water gets inside the carry-all, it will easily drain out. Of course, this being the case, the articles contained therein must be water-proofed in some type of water-tight holder, plastic bag, etc.

Figure 12:
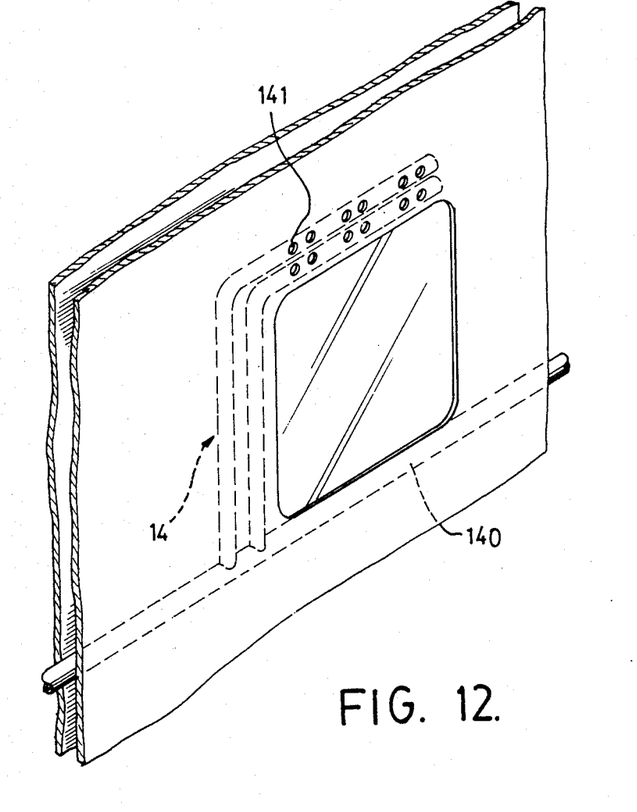
FIG. 12 is a cutaway view of an air-supply system in accordance with the present invention.
Figure 20:
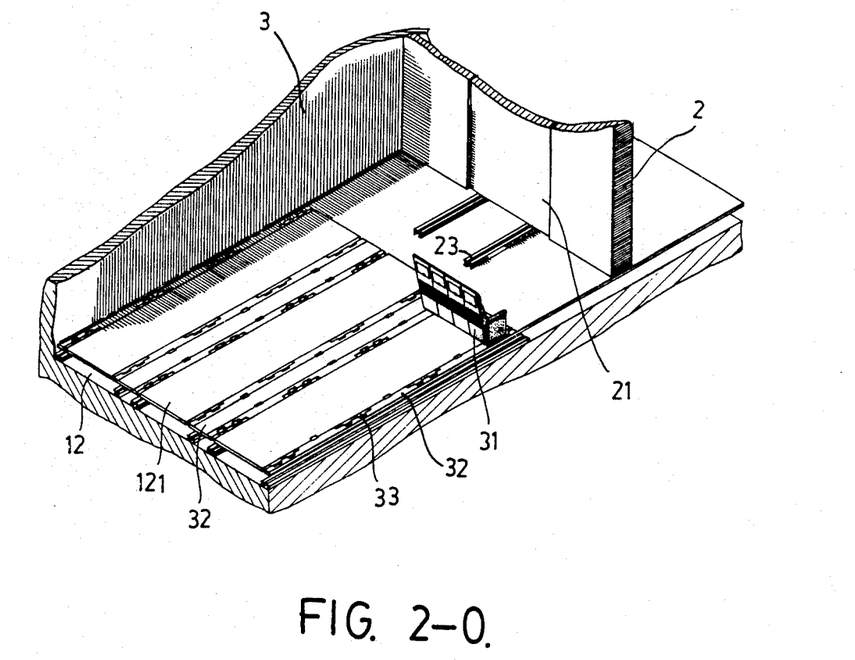

Now referring to FIG. 12, an air supply system 14 according to the present invention can be seen. The system comprises pipe 140 which runs two layers of the wall of the plane 1 according to the present invention. At the end of the pipe are a multiplicity of outlets 141 which are useful for providing an air supply for various needs, including possibly blowing up the various parts of the water safety device 5 and the collapsible carry-all 6.

As various possible embodiments might be made of the above invention without departing from the scope of the invention, it is to be understood that all matter herein decribed or shown in the accompanying drawings is to be interpreted as illustrative and not in a limiting sense. Thus it will be appreciated that the drawings are exemplary of a preferred embodiment of the invention.

I claim:
1. A comprehensive airplane safety system comprising:

(a) an oversized safety door on the lower mid-section of the fuselage of an airplane;
(b) a plurality of chair assemblies, each chair assembly being slideably supported by a sliding assembly, said sliding assembly comprising: a leg support, a wheel assembly which is fixed to the lower part of said leg support, a retainer hook which protrudes from an outer side of said wheel assembly, a retainer rail retaining the retainer hook so as to prevent any vertical movement of the chair assembly, a rail on which said leg support rests, a connecting rod connecting the inside of said wheel assembly with a second sliding assembly on the other end of said chair assembly, and a motor driven draw cord which is indirectly connected with said connecting rod so as to be able to drive said chair assembly;
(c) a flip-up floor section on the floor of the passenger section of said airplane adjacent to said safety door;
(d) emergency exit stairs, said stairs being positioned directly above said safety door; said stairs comprising: a hydraulic stairway lowering means, a slideway, and hydraulic slideway lowering means; said hydraulic lowering means lowering said stairs out of said safety door;
(e) an air flow system comprising: a multiplicity of fans set on an upper section of said airplane's fuselage which draw air through air vents on the ceiling of said airplane, an exhaust shield which extends slightly above said fans so as to form an exhaust passage which exhausts the air drawn by said fans through an exhaust outlet at the rear of said exhaust shield;
(f) a water safety device; said water safety device comprising an inflatable chest support, two inflatable paddlewheels, handlebars connecting said chest support and said paddlewheels, said handlebars being usable to propel said water safety device;
(g) a collapsible carry-all for carrying safety and survival items, said carry-all comprising four air pockets, four handles, and a multiplicity of drainholes in the central part of said carry-all.

* * * * *